UNITED STATES PATENT OFFICE.

MAX WALLERSTEIN AND LEO WALLERSTEIN, OF NEW YORK, N. Y.

PROCESS OF PRODUCING BEVERAGES.

1,214,729.     Specification of Letters Patent.     Patented Feb. 6, 1917.

No Drawing.     Application filed June 21, 1916. Serial No. 104,917.

*To all whom it may concern:*

Be it known that we, MAX WALLERSTEIN and LEO WALLERSTEIN, citizens of the United States, residing in the city, county, and State of New York, respectively, have invented certain new and useful Improvements in Processes of Producing Beverages, fully described and represented in the following specification.

This invention relates to a process of producing a beverage having the aroma and flavor of malt beverages.

In an application filed of even date herewith, there is described and claimed a composition of synthetic extract having a flavor and aroma similar to that of malt and containing the reaction products of amino bodies and sugar.

The present invention relates to a process of utilizing said extract by making a beverage therefrom having the characteristic flavor and aroma of malt beverages.

In carrying the invention into effect, the extract is dissolved in water. It will usually be found advantageous to employ about five to ten per cent. of the extract. The solution is then boiled with hops to give it the agreeable bitter hop flavor, the proportion of hops employed being varied according to the degree of bitterness desired. A satisfactory proportion is about half a pound of hops to a barrel of thirty-one gallons of the finished product. After the boiling has been continued for say about an hour, the liquid is cooled down to about 1° to 2° C. and yeast added in the proportion, say, of about one pound of brewers' yeast per barrel of thirty-one gallons. The liquid containing the yeast may be maintained at a temperature from 1° to 2° C., or it may be cooled under 1° C., according to the product desired. If a product containing a low percentage of alcohol is desired, the liquid should be maintained at a low temperature, preferably at from 1° to 2° C., under which condition a slight fermentation will take place. This should be interrupted, preferably by cooling, when the desired percentage of alcohol has developed. A very palatable beverage is produced by interrupting the fermentation when 0.3 of one per cent. of alcohol by volume has been developed. After the fermentation is interrupted, the liquid should be filtered. This removes the yeast and practically prevents any further fermentation or development of alcohol.

If, however, the liquid is cooled to about 0° C. and kept at this temperature for a few days, the filtration may be postponed until the end of the storage period. This storage period at about 0° C. may be about a week, after which the liquid may be carbonated and bottled in the usual way.

If a beverage having practically only a trace of alcohol is desired, the liquid which has been boiled with hops is cooled to about 0° C., yeast being added or not, according to the taste or flavor desired. The liquid is kept for a suitable period, say, a week, at this temperature of 0° C., after which it may be filtered, carbonated and bottled in the usual way.

What is claimed is:—

1. The process of making a beverage consisting in dissolving a synthetic extract containing the reaction products of amino bodies and sugar in water, boiling with hops, cooling and filtering.

2. The process of making a beverage consisting in dissolving a synthetic extract containing the reaction products of amino bodies and sugar in water, boiling with hops, cooling, filtering and carbonating.

3. The process of making a beverage consisting in dissolving a synthetic extract containing the reaction products of amino bodies and sugar in water, boiling with hops, cooling, adding yeast, and filtering.

4. The process of making a beverage consisting in dissolving a synthetic extract containing the reaction products of amino bodies and sugar in water, boiling with hops, cooling, adding yeast, filtering and carbonating.

5. The process of making a beverage consisting in dissolving a synthetic extract containing the reaction products of amino bodies and sugar in water, boiling with hops, adding yeast, allowing the mixture to ferment, interrupting the fermentation when the desired percentage of alcohol is developed, cooling, and filtering.

6. The process of making a beverage consisting in dissolving a synthetic extract containing the reaction products of amino bodies and sugar in water, boiling with hops, adding yeast, allowing the mixture to ferment, interrupting the fermentation when the desired percentage of alcohol is developed, cooling, filtering and carbonating.

7. The process of making a beverage consisting in dissolving the reaction products of amino bodies and sugar in water, boiling with hops, cooling to about 2° C., adding yeast, allowing the mixture to ferment, interrupting the fermentation when the desired percentage of alcohol is developed, cooling to about the freezing point, and filtering.

8. The process of making a beverage consisting in dissolving the reaction products of amino bodies and sugar in water, boiling with hops, cooling to about 2° C., adding yeast, allowing the mixture to ferment, interrupting the fermentation when the desired percentage of alcohol is developed, cooling to about the freezing point, filtering, and carbonating.

In testimony whereof, we have hereunto set our hands in the presence of two subscribing witnesses.

MAX WALLERSTEIN.
LEO WALLERSTEIN.

Witnesses:
A. WHITE,
J. F. DONOVAN.